June 20, 1967 L. W. WOLFE ET AL 3,326,114
AUTOMATIC EGG FUMIGATOR
Filed April 21, 1964 2 Sheets-Sheet 1

INVENTORS
LARRY W. WOLFE
JULIAN L. FULENWIDER
BY
Robert F. Harman
ATTORNEY

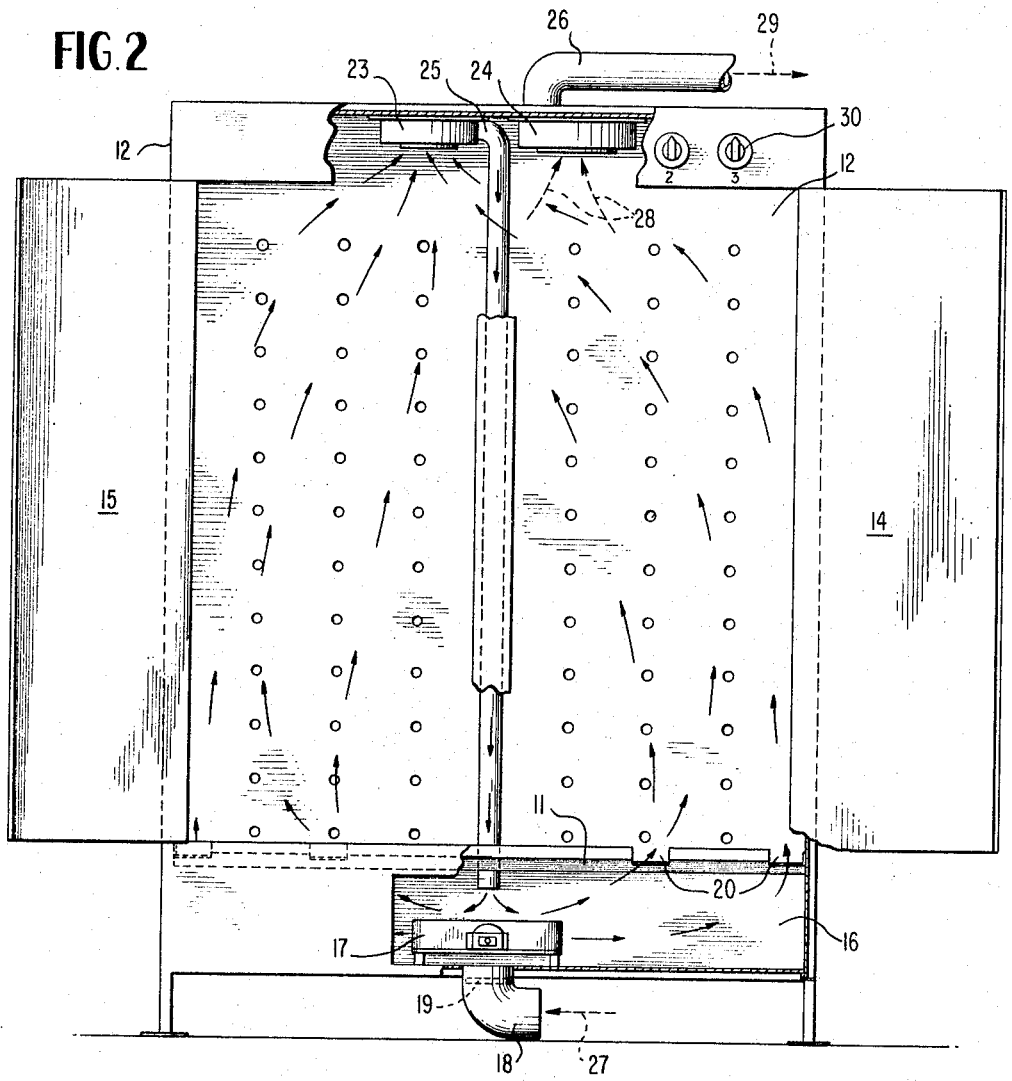
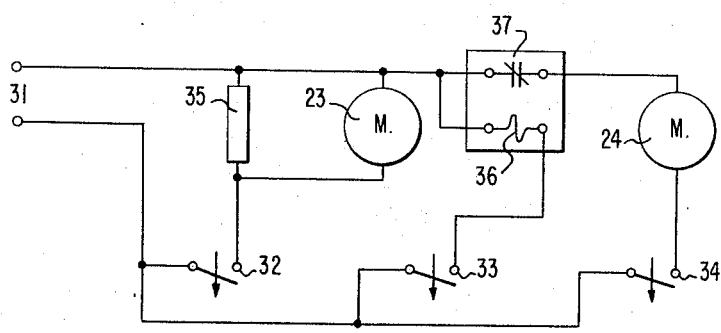

United States Patent Office 3,326,114
Patented June 20, 1967

3,326,114
AUTOMATIC EGG FUMIGATOR
Larry W. Wolfe, 454 Boulevard NE., and Julian L. Fulenwider, P.O. Box 120, both of Gainesville, Ga. 30501
Filed Apr. 21, 1964, Ser. No. 361,464
7 Claims. (Cl. 99—258)

This invention relates to a new and improved automatic egg fumigator to be used to destroy any harmful bacteria or virus on egg shells, as soon as the eggs are removed from the nest, prior to penetration of the shell by the germs, and without preserving the egg.

Poultry diseases, originating on egg shells, have always posed a problem for poultrymen. Many germs are present on the egg shell when the egg is laid. These germs immediately commence to work their way through the shell to the embryo. Some germs can penetrate the shell by the 25th hour after the egg is laid. Should this happen, the egg would be unfit for human consumption or would produce an unhealthy chicken should it be allowed to incubate. Thus, it is obvious that a means by which the average poultryman could automatically fumigate eggs so that they would be fit for human consumption while not preserving the eggs so that they could still be incubated and produce healthy chicks would be extremely desirable.

Temperature and humidity are very important in the fumigation of eggs. Temperature is important for the reason that when the body heat has left the egg, if its temperature is raised to 85° F., incubation begins, and if the temperature is again lowered below 85° F., the embryo dies. Humidity is important because most fumigant gases require humidity of at least 13% or the gas generated will return to a solid state. It is obvious that any gas generated which turned to a powder could not properly fumigate the eggs and therefore would be rather useless. A popular fumigant, Formaldegen, is an example of a gas which will do just this.

It is therefore an object of this invention to provide a new and useful egg fumigator which will provide the correct temperature and humidity for proper fumigation.

Another object of this invention is to provide an egg fumigator with automatic controls for timing and advancing through each step of a fumigating sequence.

Another object of this invention is to provide an egg fumigator which will generate, circulate, and exhaust fumigating gases automatically.

Still another object of this invention is to provide an egg fumigator which will insure that the fumigant gas contacts the entire surface of every egg shell.

A further object of this invention is to provide an improved egg fumigator which may be easily and economically manufactured for portable on-the-farm use by small poultry farm operators.

With the foregoing and other objects in view, the invention resides in the following specification and appended claims, certain embodiments and details of construction being illustrated in the accompanying drawings in which:

FIGURE 2 is a front view of the fumigating cabinet with the fumigant circulation patterns indicated; and, FIGURE 3 is a schematic of the automatic control apparatus.

Figure 1:
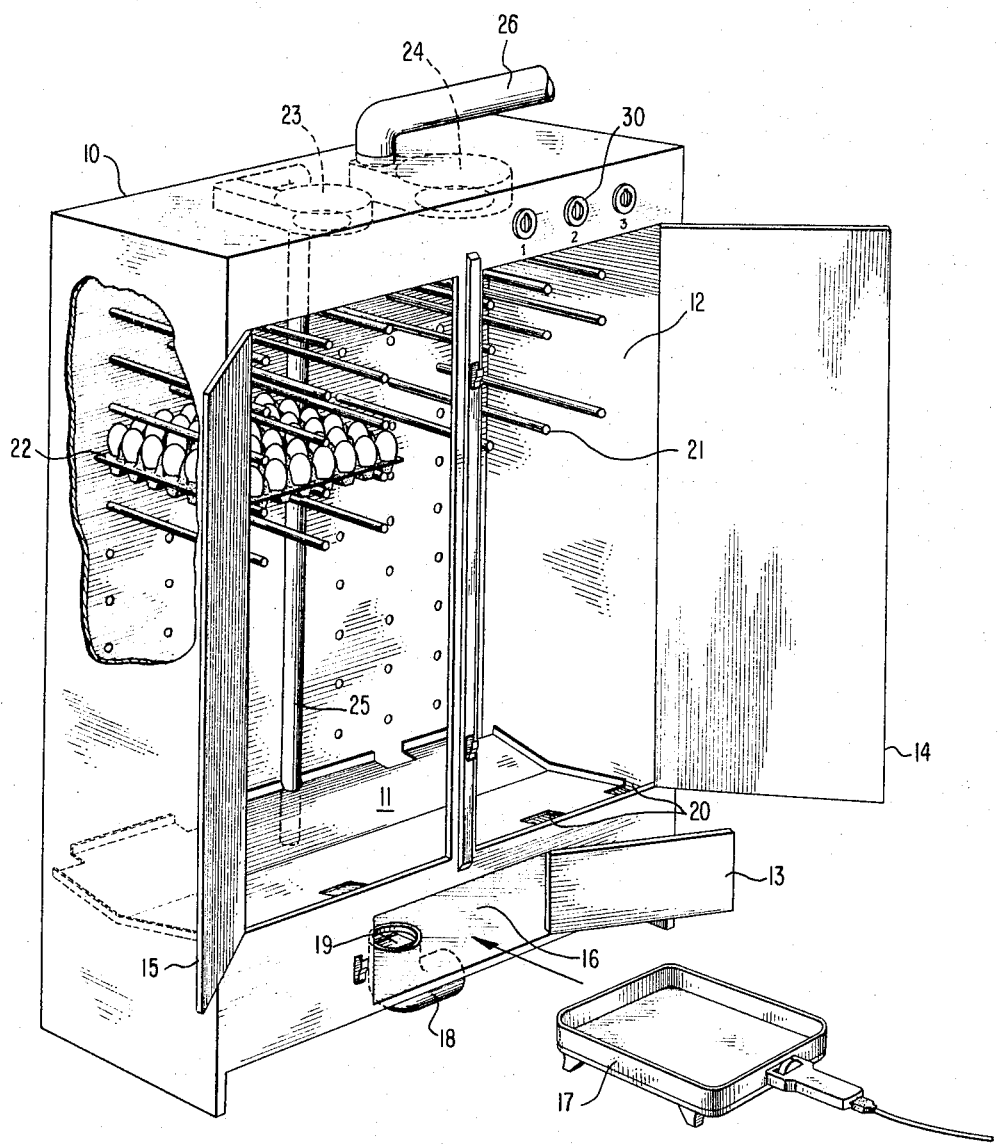
FIGURE 1 is an isometric view of the opened fumigating cabinet.

Referring now to the drawings, wherein like reference numerals have been used to identify identical parts in the several views, FIG. 1 represents a typical construction of the fumigating cabinet 10. For purposes of explanation and illustration, the cabinet will be considered as having inside dimensions of 60 inches in over-all height, 48 inches wide, and 18 inches deep. A V-shaped pan 11 is positioned about 12 inches from the base so that an egg storage compartment 12 will be about 48 inches in height. A fumigator cabinet of these dimensions would have a maximum capacity of approximately 800 turkey or 1500 chickens eggs and require a fumigation cycle of 35 minutes and the use of 5 grams of Formaldegen in 1 ounce of water for the fumigating gas.

The cabinet 10 is constructed so that all walls and joints will prevent the escape of the fumigant gas. Doors 13, 14 and 15 are fitted with rubberized gaskets and pressure latches to assure a gas-tight closure. Cabinet 10 consists of essentially two major sections separated by the V-shaped pan 11. The lower section 16 is the fumigant gas generating portion and is accessible through door 13. The gases are generated by placing a fumigant material in the electrically heated pan 17. A 15-watt pan capable of heating to 400° F. will suffice for a cabinet of the example size. Pan 17 is here shown as a removable unit. It is obvious that the pan could be conveniently fixed in units of larger dimensions and that convenience here dictates the use of a removable unit. The floor of the fumigant generating section 16 is fitted with an intake pipe 18 and one-way intake valve 19. The pipe 18 may be fitted with suitable filter means or elevated to a position where dust will not be sucked into the cabinet from the floor.

Sections 16 and 12 of the cabinet are separated by the V-shaped pan 11. This pan serves a two-fold purpose, the most obvious being to prevent the dirt, feathers, straw, etc., which cling to the eggs from falling into the generating section. Secondly, it acts as a deflector for the fumigant gases forcing them to rise to the egg storage section through a series of ports 20 arranged around the periphery of the pan 11.

The egg storage compartment 12 is fitted with a plurality of suitably mounted, removable, support bars 21. The bars are preferably removable so that filler flats 22 or baskets (not shown) may be arranged as desired. At the top of the compartment is a pair of squirrel cage blowers 23 and 24. Again using the assumed cabinet as an example, the recirculating blower 23 should be capable of pumping 50 cubic feet per minute in operation, and the exhaust blower 24 should be capable of pumping 160 cubic feet per minute in operation. Blower 23 draws the fumigating gases up through ports 20, past the eggs, and into the blower where they are forced down return duct 25 to the generating section where the circulation cycle begins again. The pressure created by this blower is sufficient to keep valve 19 closed preventing escape of the gases into the room. Exhaust blower 24 is fitted with suitable ducting pipes 26 to exhaust the fumigant gases to the outside of the building. Blower 24 will cause valve 19 to be drawn open, when the exhaust cycle begins, thus preventing the creation of a vacuum within the cabinet.

FIGURE 2 illustrates the flow patterns of the gases within the cabinet. The solid arrows represent the recirculation of the fumigant gases caused by blower 23. This pattern is fairly similar for exhausting the cabinet, adding those flows shown by broken arrows 27, 28 and 29 leading to blower 24 to the flow pattern for fumigating and naturally deleting the arrows leading to the now dormant blower 23.

The automatic control is provided by the control 30 shown in FIGS. 1 and 2 and in the schematic of FIG. 3. Referring to FIG. 3, the control is connected to a suitable power source 31. Again using our example, the power source would be the normal 110-volt 60-cycle house power. Contacts 32, 33 and 34 are time opened contacts. Setting the timing means will close all three contacts. The cabinet having the capacity of our example requires a cycle of about 35 minutes. The timer would be arranged to open contact 32 after 10 minutes, contact 33 after 25 minutes, and contact 34 after 35 minutes. Setting the timer would close contacts 32, 33 and 34 thus energizing heating element 35, of heating pan 17, recirculating blower 23, and relay 36 which would open normally closed contacts 37. At the end of 10 minutes, contact 32 opens deenergizing heating element 35 and blower 23. The gases will move on their own contacting the surfaces of the egg shells. At twenty-five minutes, contact 33 will be opened deenergizing relay 36, closing contacts 37, and energizing exhaust blower 24. This blower will be deenergized at the end of 35 minutes when contacts 34 open.

Thus, we have described an improved egg fumigator which may be economically produced for use by the small poultry farm operator. This egg fumigator may be economically operated by the poultryman on his farm without requiring any special skills or training. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein:

What is claimed and desired to be secured by United States Letters Patent is:

1. An egg fumigator, comprising a substantially gastight fumigating housing for receiving therein eggs to be fumigated; supply means operable to supply only a predetermined amount of a fumigating gas of the type that will destroy harmful bacteria and other agents; exhaust means operable to exhaust the fumigating gas from the housing while supplying fresh air to the housing in lieu thereof; blower means operable to circulate the fumigating gas and air within said housing in a closed circuit including said housing; means for supporting eggs within said housing means; and cycle control means operable to automatically operate said blower means for circulating said predetermined amount of fumigating gas only a predetermined period of time long enough to destroy the harmful bacteria but not long enough to preserve the eggs, said cycle control means being operable to automatically initiate operation of said exhaust means before the eggs can be preserved by said gas and to terminate operation of said exhaust means after a predetermined period of time.

2. The fumigator of claim 1, wherein said supply means generates the fumigating gas within said housing.

3. The fumigator of claim 2, wherein said housing includes wall means forming a separate compartment separated from the eggs and enclosing said supply means.

4. The fumigator of claim 1, wherein said means for supporting eggs is adjustable throughout the housing and operable to support the eggs in spaced relationship.

5. The fumigator of claim 1, wherein said means for supporting the eggs includes rods releasably and selectively secured in apertures in said housing.

6. The fumigator of claim 1, wherein said exhaust means and said blower means include two blowers to respectively exhaust the fumigating gases and circulate the fumigating gases throughout the housing, and a one-way valve means operable to supply air into said housing but preventing fumigating gas from escaping from said housing.

7. The fumigator of claim 1 wherein said cycle control means includes a circuit having an electrically operated gas generating unit in parallel with an electrically controlled gas circulating fan, both of which are operatively connected in series with a timer controlled switch, and exhaust fan means connected in circuit with timer controlled means operable to turn the exhaust fan means on when the gas generating unit and circulating fan are turned off.

References Cited
UNITED STATES PATENTS

| | | | |
|---|---|---|---|
| 242,264 | 5/1881 | Bullymore | 98—33 |
| 520,549 | 5/1894 | Underwood | 99—258 X |
| 745,458 | 12/1903 | Perkins | 119—37 |
| 1,657,981 | 1/1928 | Vale | 21—124 |
| 2,254,276 | 9/1941 | Ellis | 21—109 |
| 2,452,016 | 10/1948 | Lyon | 99—259 |
| 2,842,043 | 7/1958 | Reuland | 99—259 |
| 2,845,786 | 8/1958 | Chrisman | 68—18.0 |

FOREIGN PATENTS

| | | |
|---|---|---|
| 835,837 | 10/1938 | France. |
| 1,013,897 | 5/1952 | France. |
| 375,887 | 10/1939 | Italy. |
| 162,080 | 2/1958 | Sweden. |

OTHER REFERENCES

German printed application No. K20171, December 1956.

BILLY J. WILHITE, *Primary Examiner.*

WALTER A. SCHEEL, *Examiner.*

C. I. COUGHENOUR, *Assistant Examiner.*